United States Patent
Elliott

(10) Patent No.: US 8,767,942 B2
(45) Date of Patent: Jul. 1, 2014

(54) MUTING AUDIO IN TURRET SWITCHING SYSTEMS

(75) Inventor: Daniel Raymond Elliott, Southbury, CT (US)

(73) Assignee: IPC Systems, Inc, Jersey City, NJ (US)

( * ) Notice: Subject to any disclaimer, the term of this patent is extended or adjusted under 35 U.S.C. 154(b) by 972 days.

(21) Appl. No.: 12/576,774

(22) Filed: Oct. 9, 2009

(65) Prior Publication Data

US 2011/0085655 A1    Apr. 14, 2011

(51) Int. Cl.
*H04M 3/00* (2006.01)
*H04L 12/66* (2006.01)

(52) U.S. Cl.
USPC .......................................... 379/242; 370/352

(58) Field of Classification Search
USPC ............. 379/202.01, 242; 455/416, 518, 519; 370/260
See application file for complete search history.

(56) References Cited

U.S. PATENT DOCUMENTS

| | | | |
|---|---|---|---|
| 7,317,791 B2 * | 1/2008 | Carlson | 379/202.01 |
| 7,983,199 B1 * | 7/2011 | Nguyen et al. | 370/260 |
| 2005/0076128 A1 * | 4/2005 | Tsai | 709/227 |
| 2005/0094792 A1 | 5/2005 | Berthoud et al. | 379/202.01 |
| 2006/0063551 A1 * | 3/2006 | Martin et al. | 455/519 |
| 2007/0263783 A1 * | 11/2007 | Speranza | 379/67.1 |
| 2009/0098898 A1 * | 4/2009 | Patterson | 455/521 |

OTHER PUBLICATIONS

International Search Report, Int'l Patent Appl'n No. PCT/US2010/050390, Apr. 19, 2012, 3 pages.
Notification Concerning Transmittal of International Preliminary Report on Patentability and International Preliminary Report on Patentability, Int'l Patent Appl'n No. PCT/US2010/050390, Apr. 19, 2012, 8 pages.

* cited by examiner

*Primary Examiner* — Sonia Gay
(74) *Attorney, Agent, or Firm* — Fitzpatrick, Cella, Harper & Scinto

(57) ABSTRACT

Broadcasting data streams to telephony devices via talk paths, wherein audio data streams are muted based on connection states of each of the plurality of talk paths. Each telephony device sends an input audio data stream to a media server via a respective talk path. The media server combines input audio data streams received from the telephony devices to generate output audio data streams for sending to the telephony devices via the respective talk paths. For each telephony device, a determination is made as to whether to mute the respective output audio data stream. The determination is based on connection states of each of the talk paths.

70 Claims, 9 Drawing Sheets

MUTING AUDIO IN TURRET SWITCHING SYSTEMS

FIELD

The present disclosure generally relates to telecommunication systems, and more particularly to turret switching systems.

BACKGROUND

Audio communication in trading floor environments is achieved utilizing specialized hardware and software turret switching systems. A turret switching system is a specialized turret switching system that allows a relatively small number of users to access a large number of external lines and provides enhanced communication features such as hoot-n-holler, push-to-talk, intercom, video and large-scale conferencing.

Users interface with a turret switching system through a trading turret device, which can be implemented in dedicated hardware (sometimes referred to as a "hard" turret) or in a general-purpose computer (sometimes referred to as a "soft" turret). A hard-turret is a phone-like desktop device with multiple handsets, external microphones, speakers and buttons. A soft-turret is a software application that runs on a trader's desktop personal computer (PC) or on a mobile computer such as a PDA (Personal Digital Assistant). A soft-turret application may be controlled using the native control interface that the computer provides such as a touch screen, stylus, click wheel, or mouse and keyboard. In addition to rendering a graphical image of the turret on the PC screen, the soft-turret application may also provide voice, instant messaging and presence features.

Two basic types of turret calls are known as "handset calls" and "speaker calls". Handset calls behave similarly to standard telephone calls and can be used to speak to someone else or a group of people in a conference call. An audio data stream includes a transmit channel (input audio data stream) and a receive channel (output audio data stream). Speaker Calls in a trading device have the receive channel connected to a speaker. Speaker Calls involve a push-to-talk (PTT) button which connects a microphone in a trading turret device to the transmit channel of a Speaker Call. In the case where a trading turret device is connected to multiple speaker calls, there are multiple push-to-talk buttons that can be pressed at the same time to connect the microphone of the trading turret device to the transmit channels of multiple speaker calls.

SUMMARY

A turret switching system is provided in which audio data streams broadcasted over talk paths are selectively muted.

In an example embodiment disclosed herein, a turret switching system broadcasts data streams to a plurality of telephony devices via a plurality of talk paths, and audio data streams are muted based on connection states of each of the plurality of talk paths. The turret switching system includes at least one media server and a plurality of telephony devices. Each telephony device is communicatively coupled to the at least one media server via a talk path, each telephony device is constructed to receive an output audio data stream from the at least one media server via the respective talk path, and each telephony device is constructed to send an input audio data stream to the at least one media server via the respective talk path. The at least one media server includes at least one mixer that combines input audio data streams received from the plurality of telephony devices to generate output audio data streams for sending to the plurality of telephony devices.

For each talk path, a determination is made as to whether to mute the respective output audio data stream, based on connection states of each of the plurality of talk paths. Responsive to a determination that the respective output audio data stream for a talk path device is to be muted, the respective output audio data stream is muted.

Responsive to a change of the connection state of at least one of the plurality of talk paths, a determination can be made for each talk path as to whether to mute the respective output audio data stream, based on the at least one changed connection state.

For each talk path, the connection state can include a connection type of the talk path and a state of the respective input audio data stream that is sent to the at least one media server via the talk path.

In a case where at least one talk path has a speaker-call-with-global-muting connection type, and the respective input audio data stream has an ON state, it can be determined that output audio data streams corresponding to talk paths whose respective input audio data streams have an OFF state are to be muted.

In a case where at least one talk path has a privacy connection type, and the respective input audio data stream has an ON state, it can be determined that output audio data streams and input audio data streams corresponding to talk paths having a connection type other than the privacy connection type are to be muted. In the case where the at least one talk path has the privacy connection type, and the connection type of another talk path subsequently changes to the privacy connection type, it can be determined that the output audio data stream and the input audio data stream of the other talk path are to remain muted.

In a case where at least one talk path has a handset-call-with-no-speakers connection type, it can be determined that output audio data streams and input audio data streams corresponding to talk paths having a speaker call connection type are to be muted.

The turret switching system can be a trading turret switching system. The turret switching system can include an application server that creates the plurality of talk paths using a Session Initial Protocol (SIP), and sets a connection type for each talk path.

The telephony devices can include at least one of a turret device, a telephone, and a VoIP(Voice over IP) device. The at least one mixer can mute the output audio data streams. Each telephony device can be constructed to receive an output audio data stream from the at least one media server via the respective talk path using RTP (real-time transfer protocol), and each telephony device can be constructed to send an input audio data stream to the at least one media server via the respective talk path using RTP.

The mixer can be communicatively coupled to another mixer. The mixer can forward input audio data streams received by the mixer to the other mixer via a talk path, along with a mixer muting level. For each talk path connecting the mixer to a telephony device, the mixer can determine whether to mute the respective output audio data stream based a mixer muting level received from the other mixer and based on connection states of each of the plurality of talk paths connected to a telephony device.

This brief summary has been provided so that the nature of this disclosure may be understood quickly. A more complete understanding can be obtained by reference to the following detailed description and to the attached drawings.

BRIEF DESCRIPTION OF THE DRAWINGS

The features and advantages of the disclosed embodiments will become more apparent from the detailed description set forth below when taken in conjunction with the drawings in which like reference numbers indicate identical or functionally similar elements.

DETAILED DESCRIPTION

Example embodiments of the present disclosure are now described in more detail herein in terms an example trading environment. This is for convenience only and is not intended to limit the application of the present disclosure. In fact, after reading the following description, it will be apparent to one skilled in the relevant art(s) how to implement alternative embodiments, such as security/law enforcement, utilities, healthcare, and customer support (e.g., contact centers) environments.

Figure 1:
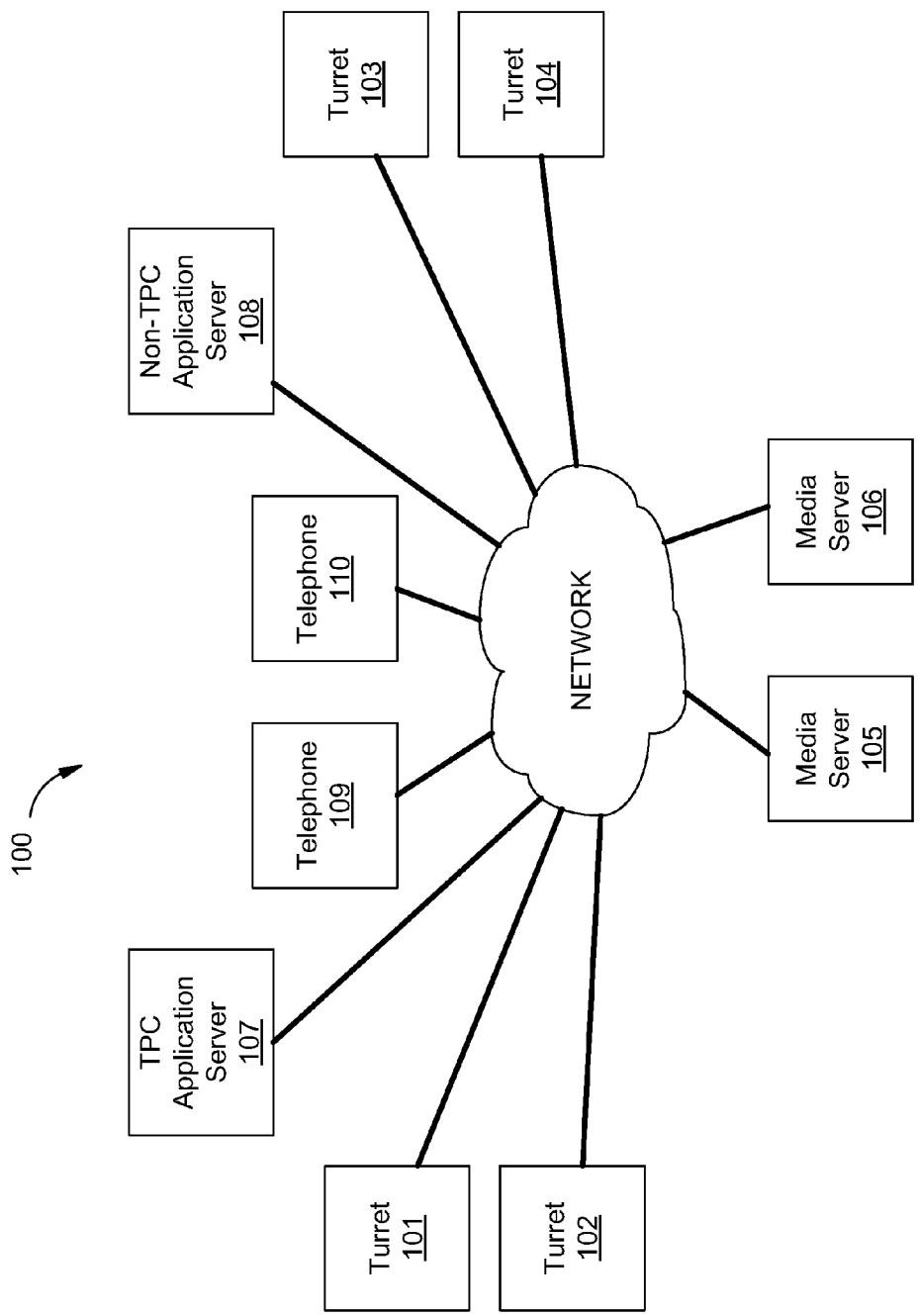
FIG. 1 is a representative diagram of a turret switching system relevant to one example embodiment.

FIG. 1 is a representative diagram of a turret switching system 100 relevant to one example embodiment. As shown in FIG. 1, turret switching system 100 includes talk-path-control(TPC)-enabled turrets 101 to 104, talk-path-control (TPC)-enabled media servers 105 and 106, talk-path-control (TPC)-enabled application server 107, non-TPC-enabled application server 108, and telephones 109 and 110, which are all interconnected via a network. In the example embodiment, the network is an IP network, however, in other embodiments, the network can be any other suitable type of network.

TPC-enabled turrets 101 to 104 are "hard" turrets, but in other example embodiments, any of turrets 101 to 104 can be "soft" turrets. Turrets 101 to 104 use a signaling protocol to establish a media stream to a TPC-enabled media server via an application server (e.g., TPC-enabled application server 107). Turrets 101 to 104 are TPC-enabled turrets, meaning that they send a push-to-talk state (PTS) to a TPC-enabled media server, such as, for example, TPC-enabled media server 105.

TPC-enabled media servers 105 and 106 are IP-based devices that include mixers that combine media streams from different IP devices to produce an individualized stream for each IP device. Each TPC-enabled media server includes a network media port, a TPC-enabled mixer, media streams between the mixer and the network media port, and media streams between the mixer of the TPC-enabled media server and mixers of other TPC-enabled media servers. The TPC-enabled mixer combines media streams together.

In the example embodiment, each media server includes one mixer. However, in other example embodiments, a media server can include more than one mixer, and such a media server can include media streams between mixers within the same media server.

The size of a mixer has a capacity. A conference (among users of turret devices and telephones) having a size that exceeds the capacity of a single mixer can be created by joining mixers together in an acyclic fashion. In the example embodiment, the mixer in media server 105 is joined together with the mixer in media server 106 to increase the size of a conference. However, in other example embodiments, multiple mixers can be joined together within a single media server to increase the size of a conference.

TPC-enabled media servers 105 and 106 are controlled by a TPC-enabled application server (e.g., 107), which uses signaling to control the mixer. TPC-enabled media servers 105 and 106 can connect to telephony devices, such as, for example, TPC-enabled turrets (e.g., 101 to 104), telephones (e.g., 109 and 110), and VoIP (Voice over Internet Protocol) devices.

Telephones 109 and 110 are telephony devices that send and receive audio, such as, for example, headsets, hands-free earpieces, PDS's, smart phones, softphones on a PC, or any other suitable type of telephony device. Telephones 109 and 110 use a signaling protocol to establish a media stream to a TPC-enabled media server via an application server. Telephones 109 and 110 send signaling via either a non-TPC-enabled application server (e.g., 108) or a TPC-enabled application server (e.g., 107).

In the example embodiment, TPC-enabled media servers 105 and 106, TPC-enabled application server 107, and non-TPC-enabled application server 108 are separate devices. However, in other embodiments, two or more of TPC-enabled media servers 105 and 106, TPC-enabled application server 107, and non-TPC-enabled application server 108 can be combined into a single device.

Figure 2:
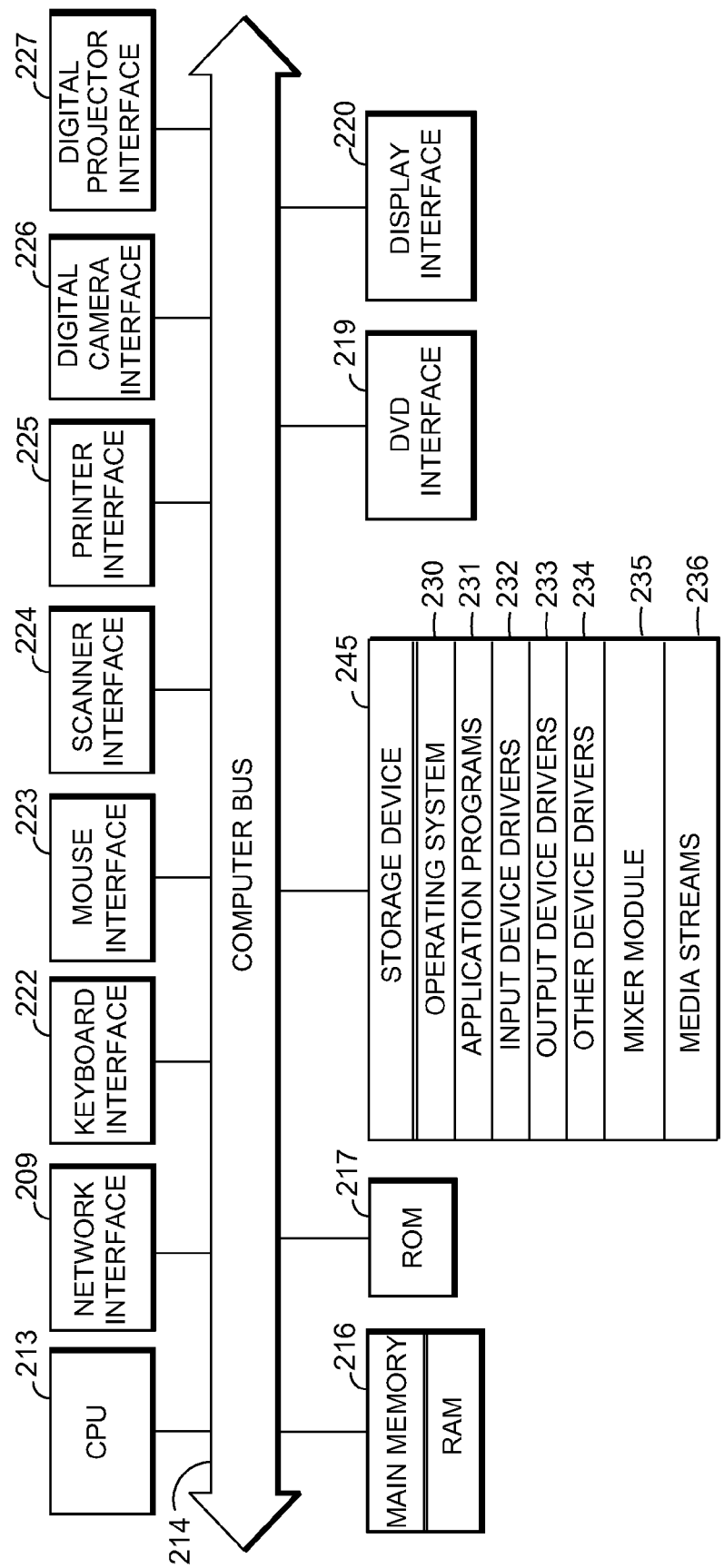
FIG. 2 is a detailed block diagram showing the internal architecture of a media server, according to one example embodiment.

FIG. 2 is a detailed block diagram showing the internal architecture of any one of TPC-enabled media servers 105 and 106. As shown in FIG. 2, each mixer includes central processing unit (CPU) 213 which interfaces with computer bus 214. Also interfacing with computer bus 214 are storage device 245 (e.g., a hard disk, flash memory, or the like), network interface 209, random access memory (RAM) 216 for use as a main run-time transient memory, read only memory (ROM) 217, DVD disk interface 219, display interface 220 for a monitor, keyboard interface 222 for a keyboard, mouse interface 223 for a pointing device, scanner interface 224 for a scanner, printer interface 225 for a printer, digital camera interface 226 for a digital camera, and digital projector interface 227 for a digital projector.

In the example embodiment, storage device 245 is a hard disk, but in other embodiments, storage device 245 can be a flash memory, or any other suitable type of persistent storage device.

RAM 216 interfaces with computer bus 214 so as to provide information stored in RAM 216 to CPU 213 during execution of the machine-executable instructions in software programs such as an operating system, application programs, and device drivers. More specifically, CPU 213 first loads computer-executable process steps (encoded in machine-executable instructions) from storage device 245, or another storage device into a region of RAM 216. CPU 213 can then execute the stored process steps from RAM 216 in order to execute the loaded computer-executable process steps. Data such as audio data or other information can be stored in RAM 216, so that the data can be accessed by CPU 213 during the execution of computer-executable software programs (encoded in machine-executable instructions), to the extent that such software programs have a need to access and/or modify the data.

As also shown in FIG. 2, storage device 245 contains operating system 230, and application programs 231 (encoded in machine-executable instructions), such as TPC-enabled media server applications. Storage device 245 also contains device drivers for software interface to devices, such as input device drivers 232, output device drivers 233, and other device drivers 234. Storage device 245 also contains TPC-enabled mixer module 235, and media streams 236. TPC-enabled mixer module 235 comprises computer-executable process steps (encoded in machine-executable instructions) that combine media streams together. Media streams 236 include media streams between the mixer of the TPC-enabled media server and network interface 219 (i.e., the network port), and media streams between the mixer of the TPC-enabled media server and mixers of other TPC-enabled media servers.

TPC-enabled mixer module 235 generally comprises computer-executable process steps (encoded in machine-executable instructions) that combine input audio data streams received from a plurality of telephony devices (e.g., 101 to 104) to generate output audio data streams for sending to the plurality of telephony devices. For each telephony device, mixer module 235 determines whether to mute the respective output audio data stream, based on connection states of each of a plurality of talk paths that communicatively couple the telephony devices to the TPC-enabled media server. For each talk path, the connection state comprises a connection type for the talk path, and a state of the respective input audio data stream that is sent to the TPC-enabled media server via the talk path.

Responsive to a determination that the respective output audio data stream for a talk path is to be muted, mixer module 235 mutes the respective output audio data stream, such that a one speaker of the telephony device does not output an audible signal corresponding to the output audio data stream.

Responsive to a change of the connection state of at least one of the plurality of talk paths, mixer module 235 determines, for each telephony device, whether to mute the respective output audio data stream, based on the at least one changed connection state.

Figure 3:
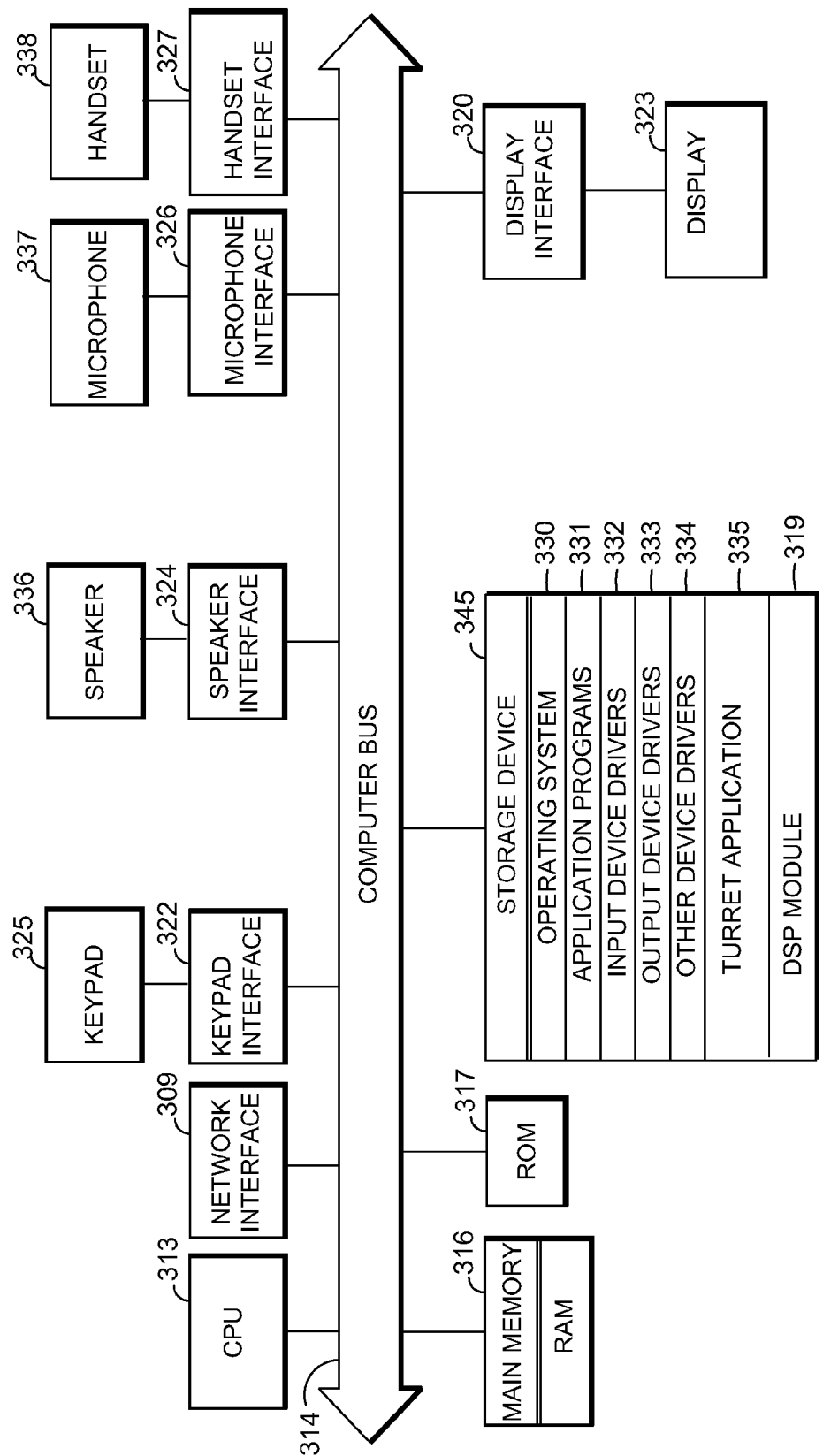
FIG. 3 is a detailed block diagram depicting the internal architecture of a turret device, according to one example embodiment.

FIG. 3 is a detailed block diagram showing the internal architecture of any one of TPC-enabled turrets 101 to 104. As shown in FIG. 3, each turret includes central processing unit (CPU) 313 which interfaces with computer bus 314. Also interfacing with computer bus 314 are storage device 345 (e.g., a hard disk, flash memory, or the like), network interface 309, random access memory (RAM) 316 for use as a main run-time transient memory, read only memory (ROM) 317, display interface 320 for display 323, keypad interface 322 for keypad 325, speaker interface 324 for a speaker 336, microphone interface 326 for a microphone 337, and handset interface 327 for a handset 338.

In the example embodiment, storage device 345 is a flash memory, but in other embodiments, storage device 345 can be a hard disk, or any other suitable type of persistent storage device In the example embodiment, microphone 337 is associated with a set of speaker call transmit channels that each have a push-to-talk (PTT) button (not shown). In a case where the push-to-talk (PTT) button of a respective speaker call transmit channel is pressed, a push-to-talk state for the speaker call transmit channel is "ON" (i.e., the respective input audio data stream has an "ON" state), meaning that a valid input audio data stream is generated from audio received by the microphone 337. In a case where the push-to-talk (PTT) button or a respective speaker call transmit channel is not pressed, the push-to-talk state for the speaker call transmit channel is "OFF" (i.e., the respective input audio data stream has an "OFF" state), meaning that a valid input audio data stream is not generated from audio received by the microphone 337.

RAM 316 interfaces with computer bus 314 so as to provide information stored in RAM 316 to CPU 313 during execution of the machine-executable instructions in software programs such as an operating system, application programs, and device drivers. More specifically, CPU 313 first loads computer-executable process steps (encoded in machine-executable instructions) from storage device 345, or another storage device into a region of RAM 316. CPU 313 can then execute the stored process steps from RAM 316 in order to execute the loaded computer-executable process steps. Data such as audio data or other information can be stored in RAM 316, so that the data can be accessed by CPU 313 during the execution of computer-executable software programs (encoded in machine-executable instructions), to the extent that such software programs have a need to access and/or modify the data.

As also shown in FIG. 3, storage device 345 contains operating system 330, and application programs 331 (encoded in machine-executable instructions), such as a TPC-enabled turret application 335. Storage device 345 also contains device drivers for software interface to devices, such as input device drivers 332, output device drivers 333, and other device drivers 334.

TPC-enabled turret application 335 generally comprises computer-executable process steps (encoded in machine-executable instructions) that receive an output audio data stream from at least one TPC-enabled media server (e.g., 105 or 106) via a talk path, and send an input audio data stream to the TPC-enabled media server via the talk path. DSP module 319 renders media streams.

Figure 4:
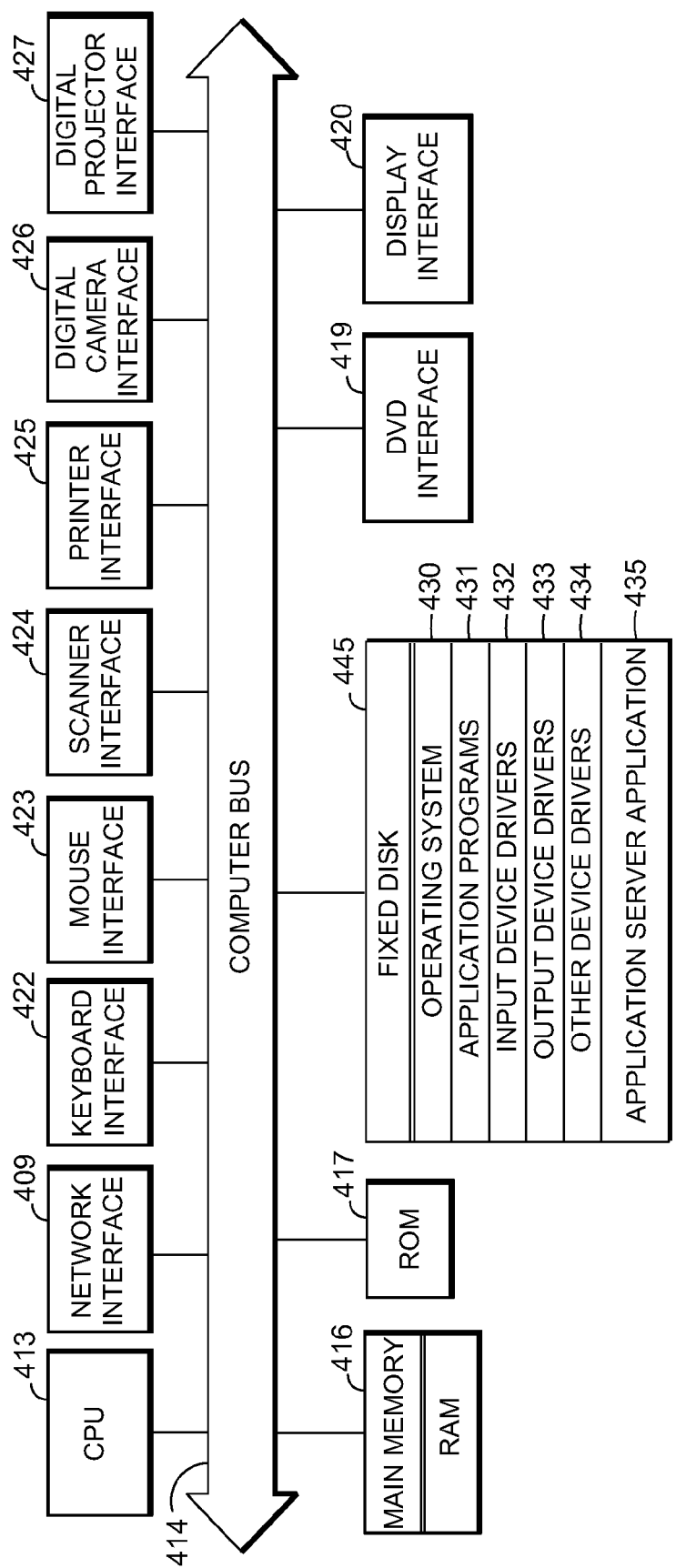
FIG. 4 is a detailed block diagram depicting the internal architecture of an application server, according to one example embodiment.

FIG. 4 is a detailed block diagram showing the internal architecture of TPC-enabled application server 107. As shown in FIG. 4, the TPC-enabled application server includes central processing unit (CPU) 413 which interfaces with computer bus 414. Also interfacing with computer bus 414 are fixed disk 445 (e.g., a hard disk, flash memory, or the like), network interface 409, random access memory (RAM) 416 for use as a main run-time transient memory, read only memory (ROM) 417, DVD disk interface 419, display interface 420 for a monitor, keyboard interface 422 for a keyboard, mouse interface 423 for a pointing device, scanner interface 424 for a scanner, printer interface 425 for a printer, digital camera interface 426 for a digital camera, and digital projector interface 427 for a digital projector.

In the example embodiment, fixed disk 445 is a hard disk, but in other embodiments, fixed disk 445 can be a flash memory, or any other suitable type of persistent storage device.

RAM 416 interfaces with computer bus 414 so as to provide information stored in RAM 416 to CPU 413 during execution of the machine-executable instructions in software programs such as an operating system, application programs, and device drivers. More specifically, CPU 413 first loads computer-executable process steps (encoded in machine-executable instructions) from fixed disk 445, or another storage device into a region of RAM 416. CPU 413 can then execute the stored process steps from RAM 416 in order to execute the loaded computer-executable process steps. Data such as audio data or other information can be stored in RAM 416, so that the data can be accessed by CPU 413 during the execution of computer-executable software programs (encoded in machine-executable instructions), to the extent that such software programs have a need to access and/or modify the data.

As also shown in FIG. 4, fixed disk 445 contains operating system 430, and application programs 431 (encoded in machine-executable instructions), such a TPC-enabled application server application 435. Fixed disk 445 also contains device drivers for software interface to devices, such as input device drivers 432, output device drivers 433, and other device drivers 434.

TPC-enabled application server application 435 generally comprises computer-executable process steps (encoded in machine-executable instructions) that create talk paths that communicatively couple telephony devices (e.g., 101 to 104) to at least one TPC-enabled media server (e.g., 105, 106) using a signaling protocol, and set a connection type for each talk path.

Figure 5:
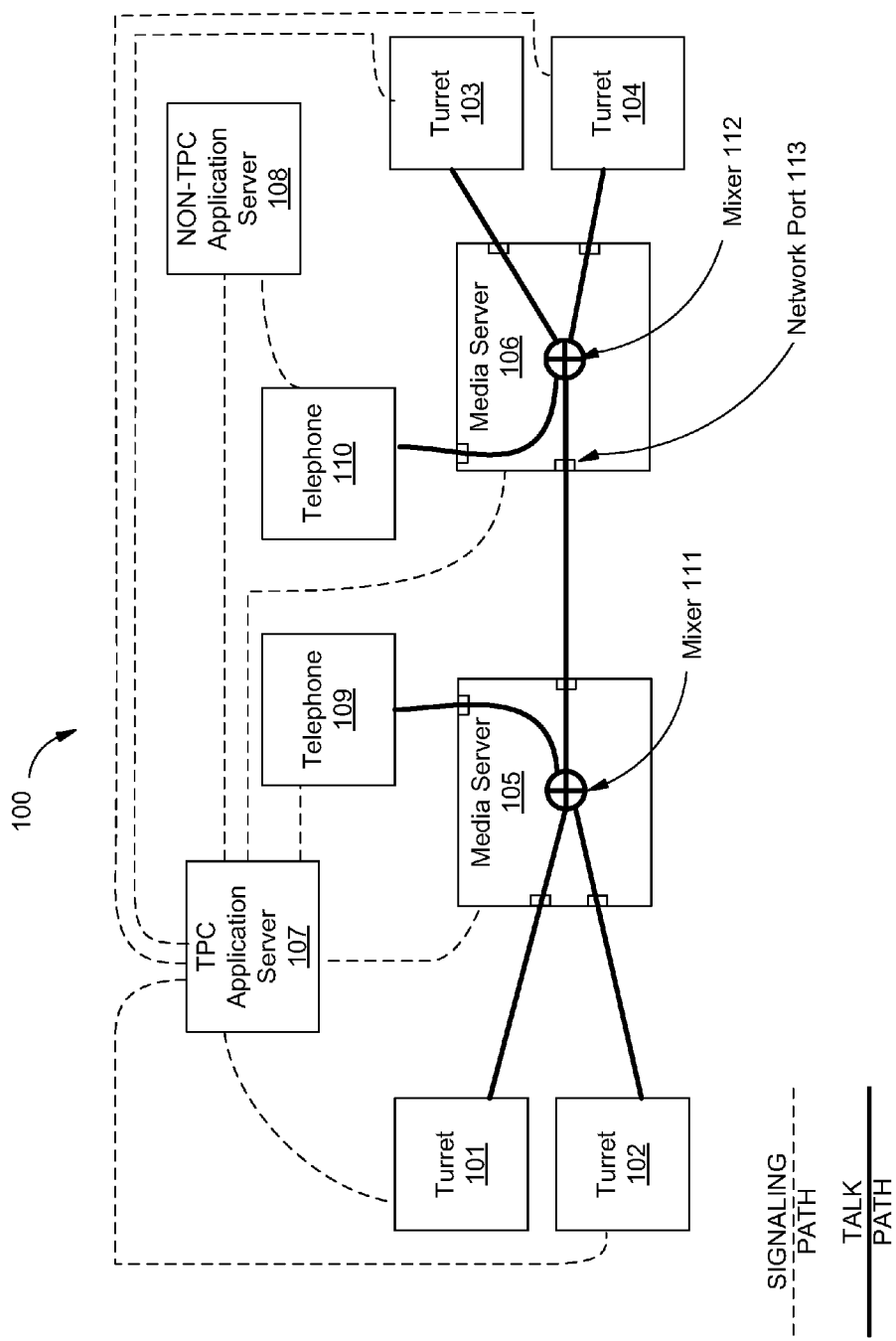
FIG. 5 is a representative diagram of turret switching system that shows talk paths and signaling paths relevant to one example embodiment.

FIG. 5 is a representative diagram of turret switching system 100 that shows talk paths (i.e., media streams) and signaling paths. As shown in FIG. 5, talk paths connect each of TPC-enabled turrets 101 to 104 and telephones 109 and 110 to one of TPC-enabled media servers 105 and 106. Signaling paths connect each of TPC-enabled turrets 101 to 104 and TPC-enabled media servers 105 and 106 to TPC-enabled application server 107. A signaling path connects telephone 109 to TPC-enabled application server 107, and a signaling path connects telephone 110 to non-TPC-enabled application server 108. A signaling path connects TPC-enabled application server 107 to non-TPC-enabled application server 108.

Session Initiation Protocol ("SIP") is used to create the signaling paths shown in FIG. 5. SIP is an application-layer control (i.e., signaling) protocol for creating, modifying, and terminating sessions, such as Internet telephony calls, with one or more participants and is defined in RFC-3261, "SIP: Session Initiation Protocol."

SIP is part of a communication architecture that provides the ability to signal and communicate between telephony systems in collaboration with other protocols such as Session Description Protocol ("SDP") and Real-Time Protocol ("RTP"). SDP describes streaming media initialization parameters in an ASCII string and multimedia communication sessions for the purposes of session announcement, session invitation, and parameter negotiation. SDP is defined in RFC-4566, "SDP: Session Description Protocol." RTP is a standardized packet format for delivering audio and/or video data over IP networks and is defined by RFC-3550, "RTP: A Transport Protocol for Real-Time Applications" which has been updated by RFC-5506, "Support for Reduced-Size Real-Time Transport Control Protocol (RTCP): Opportunities and Consequences." RFC-4566, RFC-3350, RFC-5506, and RFC-3261 are hereby incorporated by reference in their entirety.

Each TPC-enabled turret 101 to 104 uses the respective signaling path to send a signaling instruction to the TPC-enabled application server 107 which creates the respective talk path between the turret and the TPC-enabled media server (e.g., 105, 106). In response to receiving the create-talk-path instruction from a turret via the signaling path, TPC-enabled application server 107 sends a signaling instruction to a TPC-enabled media server to create the respective talk path between the turret and the TPC-enabled media server. The application server's signaling instruction is sent via the signaling path between TPC-enabled application server 107 and the TPC-enabled media server. The TPC-enabled media server then connects the talk path to the TPC-enabled mixer (e.g., 111, 112) via a network port of the TPC-enabled media server (e.g., 113).

In the example embodiment, each media server has only one mixer. In other example embodiments in which a media server has more than one mixer, the media server connects the talk path to the appropriate TPC-enabled mixer in response to receiving the signaling instruction from the TPC-enabled application server.

Similarly, telephone 109 uses the respective signaling path to send a signaling instruction to the TPC-enabled application server 107 which creates the respective talk path between telephone 109 and TPC-enabled media server 105. In response to receiving the create-talk-path instruction from telephone 109 via the signaling path, TPC-enabled application server 107 sends a signaling instruction to TPC-enabled media server 105 to create the respective talk path between telephone 109 and TPC-enabled media server 105. The application server's signaling instruction is sent via the signaling path between TPC-enabled application server 107 and TPC-enabled media server 105. The TPC-enabled media server then connects the talk path to the TPC-enabled mixer 111 via a network port of the media server.

Telephone 110 uses the respective signaling path to send a signaling instruction to the non-TPC-enabled application server 108 which forwards the signaling instruction to the TPC-enabled application server 107. In response to receiving the create-talk-path signaling instruction forwarded by the non-TPC-enabled application server 108, TPC-enabled application server 107 sends a signaling instruction to TPC-enabled media server 106 to create the respective talk path between telephone 110 and TPC-enabled media server 106. The application server's signaling instruction is sent via the signaling path between TPC-enabled application server 107 and TPC-enabled media server 105. The TPC-enabled media server then connects the talk path to the TPC-enabled mixer 111 via a network port of the media server.

TPC-enabled application server 107 sends a signaling instruction to each of TPC-enabled media servers 105 and 106 (via respective signaling paths) to create a talk path between TPC-enabled media server 105 and TPC-enabled media server 106.

When TPC-enabled application server 107 sends a signaling instruction to a TPC-enabled media server (e.g., 105, 106) to create a talk path, TPC-enabled application server 107 specifies a connection type for the talk path in the signaling instruction. In the example embodiment, connection types include the connection types shown in Table 1.

TABLE 1

Connection Types

| Connection Type | Description |
| --- | --- |
| Speaker Call | Speaker Calls involve a push-to-talk (PTT) button which connects a microphone in a trading turret device to the transmit channel. A turret (or telephone) that is connected to a TPC-enabled mixer via a talk path having a "Speaker Call" connection type behaves like a normal call, until muting occurs. |

TABLE 1-continued

Connection Types

| Connection Type | Description |
| --- | --- |
| Speaker Call With Global Muting | A turret (or telephone) that is connected to a TPC-enabled mixer via a talk path having a "Speaker Call With Global Muting" connection type causes output audio data streams for other devices with a connection type of "Speaker Call" (whose PTT button is not pressed) to be muted when the turret's (or telephone's) PTT button is pressed. |
| Speaker Call With Privacy | In a case where at least one turret (or telephone) is connected to a TPC-enabled mixer via a talk path having a "Speaker Call With Privacy" connection type, and the respective PTT button is pressed, output audio data streams and input audio data streams corresponding to talk paths having a connection type other than the privacy connection type are muted. |
| Handset Call | Handset calls behave similarly to standard telephone calls and can be used to speak to someone else or a group of people in a conference call. |
| Handset Call With No Speakers | In a case where at least one turret (or telephone) is connected to a TPC-enabled mixer via a talk path having a "Handset Call With No Speakers" connection type, output audio data streams and input audio data streams corresponding to talk paths having either a "Speaker Call", "Speaker Call With Privacy", or "Speaker Call With Global Muting" connection type are muted. |
| Handset Call With Privacy | In a case where at least one turret (or telephone) is connected to a TPC-enabled mixer via a talk path having a "Handset Call With Privacy" connection type, output audio data streams and input audio data streams corresponding to talk paths having a connection type other than the privacy connection type are muted. |
| Default Call | Indicates the connected device is always connected and is never muted and has no impact on any muting decisions. This is the default connection type, if a connection type is not specified. |
| Mixer to Mixer Connection | Indicates a talk path connecting two TPC-enabled mixers. |
| TurretTest | Indicates a talk path connecting two mixers, wherein one TPC-enabled mixer behaves like a turret for testing purposes. |

In other embodiments, a subset of the connection types shown in Table 1 can be included, and additional connection types can be included.

In the example embodiment, after TPC-enabled application server 107 creates a talk path between a TPC-enabled turret (e.g., 101 to 104) and a TPC-enabled media server (e.g., 105, 106), the TPC-enabled turret sends the current push-to-talk state (PTS) of the turret to the corresponding TPC-enabled mixer for every media packet.

The push-to-talk state of the turret indicates whether an input audio data stream sent from the turret to a TPC-enabled mixer is valid or not. When the push-to-talk state is "ON" (i.e., when the input audio data stream has an "ON" state), then the input audio data stream is valid. When the push-to-talk state is "OFF" (i.e., when the input audio data stream has an "OFF" state), then the input audio data stream is invalid. In the example embodiment, the push-to-talk state of an input audio data stream is "ON" in a case where the respective push-to-talk (PTT) button is pressed, and the push-to-talk state is "OFF" in a case where the push-to-talk (PTT) button is not pressed. In other words, in a case where the push-to-talk (PTT) button is pressed, the respective input audio data stream has an "ON" state, and in a case where the push-to-talk (PTT) button is not pressed, the respective input audio data stream has an "OFF" state.

Although depressing a PTT button causes the respective input audio data stream to have an "ON" state in the example embodiment, in other embodiments, other events can cause the input audio data stream to have an "ON" state. In other embodiments, the availability of audio data from an audio data source other than a microphone of the turret device can cause the input audio data stream to have an "ON" state. For example, in a case where the turret receives audio data from an external audio data source, a storage device, a network, or the like, the input audio data stream can have an "ON" state. Similarly, if audio data from an audio data source is not available, the input audio data stream can have an "OFF" state.

In the example embodiment, the media packets exchanged between the TPC-enabled turret and the TPC-enabled mixer are RTP (real-time transfer protocol) packets. The current push-to-talk state (PTS) of the turret is specified in an extension header of every RTP packet sent to the TPC-enabled mixer, via the respective talk path.

If a configuration property specifies that the current push-to-talk state (PTS) of a turret is to be sent to the respective TPC-enabled mixer by a TPC-enabled application server (e.g., 107), then turret sends the TPC-enabled application server the PTS, via a signaling path between the turret and the TPC-enabled application server. In response to receiving the PTS, the TPC-enabled application server sends the PTS of the turret to the mixer via a signaling path between the TPC-enabled application server and the media server.

For each TPC-enabled turret connected to a TPC-enabled mixer via a talk path, the TPC-enabled mixer sends with every RTP packet a current Mixer Muting Level (MML) of the mixer and the last push-to-talk state (PTS) received from the turret. The current Mixer Muting Level (MML) and the last push-to-talk state (PTS) received from the turret are specified in the extension header of every RTP packet sent to the turret from the TPC-enabled mixer, via the respective talk path.

If a configuration property specifies that the current Mixer Muting Level (MML) is to be sent a TPC-enabled application server (e.g., 107), then the TPC-enabled mixer sends the current MML to the TPC-enabled application server via a signaling path, and the TPC-enabled application server processes the MML.

The Mixer Muting Level (MML) for a mixer is used to determine which set of output audio data streams and input audio data streams are to be muted. The MML is a number that indicates a priority of muting. Each talk path (i.e., connection) has its own connection muting level (CML) which is used to determine the Mixer Muting Level (MML) for a TPC-enabled mixer. In particular, the MML for a TPC-enabled mixer is the maximum of the CML's of all the talk paths connected to the TPC-enabled mixer.

In the example embodiment, the maximum of the CML's is determined by keeping a count in the mixer for each muting level. Each counter represents the number of talk paths with a particular muting level. In a case where the CML of a talk path changes, corresponding counters are incremented or decremented. The MML is the highest muting level with a corresponding non-zero counter value.

Table 2 defines the Mixer Muting Levels (MML) and Connection Muting Levels (CML).

TABLE 2

Mixer Muting Levels (MML) and Connection Muting Levels (CML)

| MML/CML | Description |
| --- | --- |
| Level 0 | No output muting is performed |
| Level 1 | Output audio data streams for devices having a "Speaker Call" or "Speaker Call With Global Muting" connection type, and whose Push-to-Talk-State is "OFF" are muted. |
| Level 2 | Output audio data streams and input audio data streams corresponding to talk paths having either a "Speaker Call", "Speaker Call With Privacy", or "Speaker Call With Global Muting" connection type are muted. |
| Level 3 | Output audio data streams and input audio data streams corresponding to talk paths having a connection type other than the "Speaker Call With Privacy" or "Handset Call With Privacy" connection type are muted. |

In other embodiments, a subset of the muting levels shown in Table 2 can be included, and additional muting levels can be included.

Figure 6:
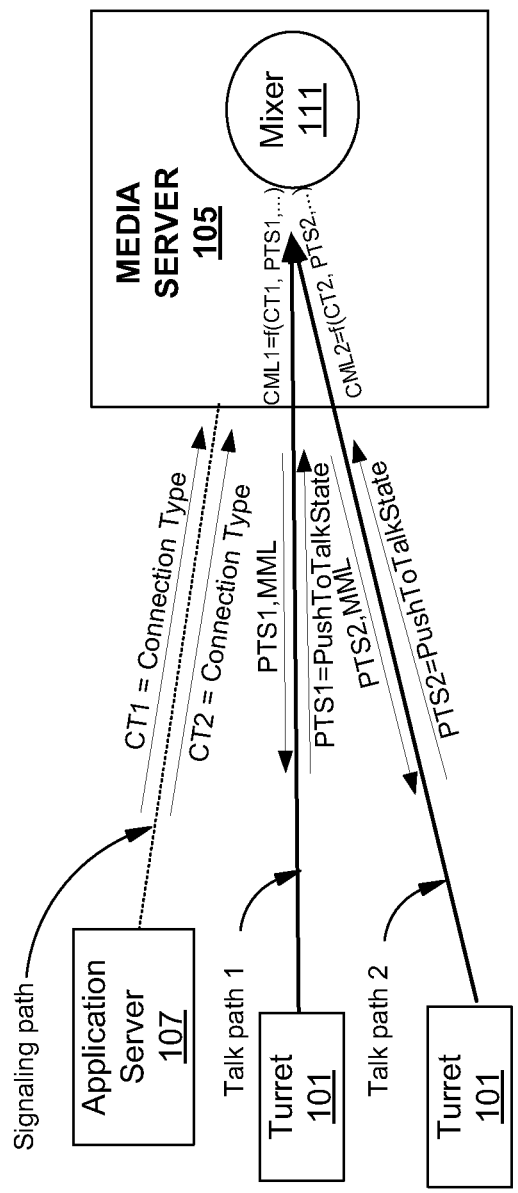
FIG. 6 is a diagram for explaining how muting levels are calculated, according to one example embodiment.

FIG. 6 is a diagram for explaining how the Mixer Muting Level (MML) is calculated. In the example embodiment depicted in FIG. 6, the RTP protocol is used to transport the push-to-talk-state (PTS) and the MML between a TPC-enabled turret and a TPC-enabled mixer via a talk path created by a TPC-enabled application server.

The connection type (CTn) for a talk path "n" is specified by the TPC-enabled application server (e.g., 107) when the TPC-enabled application server sends a signaling instruction to the TPC-enabled media server (e.g., 105, 106) to create talk path "n", which is connected to the mixer of the media server. After the TPC-enabled application server creates talk path "n" between the TPC-enabled turret (e.g., 101 to 104) and the TPC-enabled mixer (e.g., 111, 112), the TPC-enabled turret sends the current PTS of the turret to the TPC-enabled mixer in an extension header of every RTP media packet sent to the TPC-enabled mixer, via the respective talk path.

For example, as show in FIG. 6, after the TPC-enabled application server 107 sends a signaling instruction to a TPC-enabled mixer 111 (in media server 105) to create talk path 1 between TPC-enabled turret 101 and mixer 111, the TPC-enabled application server 107 specifies the connection type for talk path 1 (i.e., CT1) in the signaling instruction. After the TPC-enabled application server 107 also sends a signaling instruction to a TPC-enabled mixer 111 to create talk path 2 between TPC-enabled turret 102 and mixer 111, the TPC-enabled application server 107 specifies the connection type for talk path 2 (i.e., CT2) in the signaling instruction.

After TPC-enabled application server 107 creates talk path 1, the TPC-enabled turret 101 sends the current push-to-talk state (PTS) of the turret (i.e., PTS1) to TPC-enabled mixer 111 in a media packet. Similarly, after TPC-enabled application server 107 creates talk path 2, the TPC-enabled turret 102 sends the current push-to-talk state (PTS) of the turret (i.e., PTS2) to TPC-enabled mixer 111 in a media packet.

After receiving the connection type for talk path 1 (i.e., CT1) from TPC-enabled application server 107, and after receiving the current push-to-talk state (PTS) of turret 101 (i.e., PTS1) from turret 101, mixer 111 saves PTS1, and calculates the Connection Muting Level (CML), for talk path 1. Mixer 111 calculates the Connection Muting Level (CML) for talk path 1 by executing a calculateConnectionMixerLevel process that takes as inputs the Push-To-Talk-State (PTS1) and the Connection Type (CT1) of talk path 1, as well as the current Mixer Muting Level. The calculateConnectionMixerLevel process returns the CML (i.e., CML1) as an output, as defined by Table 3.

TABLE 3 calculateConnectionMixerLevel( )

| OUTPUT Return value Connection Muting Level | INPUT Mixer Muting Level | INPUT Connection Type | INPUT Push To Talk State |
| --- | --- | --- | --- |
| Level 1 | | Speaker Call With Global Muting | ON |
| Level 2 | | Handset Call With No Speakers | |
| Level 3 | Not level 3 | Handset Call With Privacy | |
| No Change - use previous value | Level 3 | Handset Call With Privacy | |
| Level 3 | Not level 3 | Speaker Call With Privacy | ON |
| No Change - use previous value Level 0 | Level 3 | Speaker Call With Privacy | ON |

In other embodiments, the input values and/or the output values defined in Table 3 can be different, so long as the return value (i.e., CMLn) output by the calculateConnectionMixerLevel process for a talk path "n" is based on input values for the Push-To-Talk-State (PTSn) of the respective talk path "n", the Connection Type (CTn) of the respective talk path "n", and the current Mixer Muting Level for the media server.

Similarly, after receiving the connection type for talk path 2 (i.e., CT2) from TPC-enabled application server 107, and after receiving the current push-to-talk state (PTS) of turret 102 (i.e., PTS2) from turret 102, mixer 111 saves PTS2, and calculates the Connection Muting Level (CML), for talk path 2. Mixer 111 calculates the Connection Muting Level (CML), for talk path 2 by executing the calculateConnectionMixerLevel process, that takes as inputs, PTS2 and CT2, as well as the current Mixer Muting Level. The calculateConnectionMixerLevel process returns the CML for talk path 2 (i.e., CML2).

After calculating CML1 and CML2 for talk paths 1 and 2 (respectively), mixer 111 calculates the MML, which is the maximum of all CML's for mixer 111 (i.e., the maximum of CML1 and CML2). In addition, any time a CML for a talk path changes (e.g., CML1 or CML2), mixer 111 re-calculates the MML.

After calculating the MML, TPC-enabled mixer 111 sends turret 101 the calculated MML and the last push-to-talk state (PTS) received from turret 101 (i.e., PTS1) in the next media packet. Turret 101 uses the received MML to render audio and visual messages on the turret (i.e., via the display, speaker, or handset). Similarly, TPC-enabled mixer 111 sends turret 102 the calculated MML and the last push-to-talk state (PTS) received from turret 102 (i.e., PTS2) in the next media packet. Turret 102 uses the received MML to render audio and visual messages on the turret (i.e., via the display, speaker, or handset).

For each talk path connected to the TPC-enabled mixer (e.g., 111, 112), the TPC-enabled mixer performs muting actions based on the calculated MML, the connection type for the talk path (CTn, for talk path "n"), the Connection Muting Level for the talk path (CMLn, for talk path "n"), and the push-to-talk-state for the talk path (PTSn, for connection "n").

In particular, the TPC-enabled mixer performs muting actions based on a return value returned by a muteInput process, and a return value returned by a muteOutput process.

The muteInput process takes as inputs, the calculated MML, the connection type for a particular talk path (CTn, for talk path "n"), the Connection Muting Level for the talk path (CMLn, for talk path "n"), and the push-to-talk-state for the talk path (PTSn, for connection "n"). The muteInput process returns either a "Mute" or a "Normal" return value, as defined by Table 4.

TABLE 4 muteInput

| OUTPUT Return Value Mute/Normal | INPUT Mixer Muting Level | INPUT Connection Muting Level | INPUT Connection Type | INPUT Push To Talk State |
|---|---|---|---|---|
| Normal | | | Default MixerToMixer TurretTest | |
| Normal | Level 3 | Level 3 | Don't care | |
| Mute | Level 3 | Not Level 3 | Don't care | |
| Mute | Level 2 | | Speaker Call Speaker Call With Global Muting Speaker Call With Privacy | |
| Mute | | | Don't care | Off |
| Normal | | | | |

In other embodiments, the input values and/or the output values defined in Table 4 can be different, so long as the return value output by the muteInput process for a talk path "n" is based on input values for the Push-To-Talk-State (PTSn) of the respective talk path "n", the Connection Type (CTn) of the respective talk path "n", the Connection Muting Level of the respective talk path "n", and the current Mixer Muting Level for the mixer.

Similarly, the muteOutput process takes as inputs, the calculated MML, the connection type for a particular talk path (CTn, for talk path "n"), the Connection Muting Level for the talk path (CMLn, for talk path "n"), and the push-to-talk-state for the talk path (PTSn, for connection "n"). The muteOutput process returns either a "Mute" or a "Normal" return value, as defined by Table 5.

TABLE 5 muteOutput

| OUTPUT Return Value Mute/Normal | INPUT Mixer Muting Level | INPUT Connection Muting Level | INPUT Connection Type | INPUT Push To Talk State |
|---|---|---|---|---|
| Normal | | | Default MixerToMixer TurretTest | |
| Normal | Level 3 | Level 3 | | |
| Mute | Level 3 | Not Level 3 | | |
| Mute | Level 2 | | Speaker Call Speaker Call With Global Muting Speaker Call With Privacy | |
| Mute | Level 1 | | Speaker Call Speaker Call With Global Muting | Off |
| Normal | | | | |

In other embodiments, the input values and/or the output values defined in Table 5 can be different, so long as the return value output by the muteOutput process for a talk path "n" is based on input values for the Push-To-Talk-State (PTSn) of the respective talk path "n", the Connection Type (CTn) of the respective talk path "n", the Connection Muting Level of the respective talk path "n", and the current Mixer Muting Level for the mixer.

For a talk path, if the muteInput process returns a "Mute" value, then the TPC-enabled mixer mutes the input audio data stream corresponding to the talk path. If the muteInput process returns a "Normal" value for the talk path, then the TPC-enabled mixer does not mute the input audio data stream corresponding to the talk path.

Similarly, for a talk path, if the muteOutput process returns a "Mute" value, then the TPC-enabled mixer mutes the output audio data stream corresponding to the talk path. If the muteOutput process returns a "Normal" value for the talk path, then the TPC-enabled mixer does not mute the output audio data stream corresponding to the talk path.

After TPC-enabled application server 107 creates a talk path between a telephone (e.g., 109, 110) and a TPC-enabled mixer (e.g., 111, 112), the telephone sends the current push-to-talk state (PTS) of the telephone to the TPC-enabled application server via a signaling path between the TPC-enabled application server and the telephone. In response to receiving the PTS, the TPC-enabled application server sends the current PTS to the mixer via a signaling path between the TPC-enabled application server and the respective media server. The mixer saves the received PTS of the telephone. The CML for the talk path between the telephone and the TPC-enabled mixer is determined in a manner similar to that described above with respect to a talk path between a TPC-enabled turret and the mixer.

If a configuration property specifies that the current Mixer Muting Level (MML) is to be sent to a TPC-enabled application server (e.g., 107), then the TPC-enabled mixer sends the current Mixer Muting Level (MML) to the TPC-enabled application server via a signaling path between the TPC-enabled application server and the respective TPC-enabled media server.

In the example embodiment, the state tables described above for the calculateConnectionMixerLevel, muteInput, and muteOutput processes, in Tables 3, 4, and 5 (respectively), are dynamically loaded, so that the muting actions can be changed by dynamically modifying any one of the state tables described with respect to Tables 3, 4 or 5. In other embodiments, the state tables can be hard-coded into the computer executable process steps of mixer module 235 to achieve higher performance.

Figure 7A:
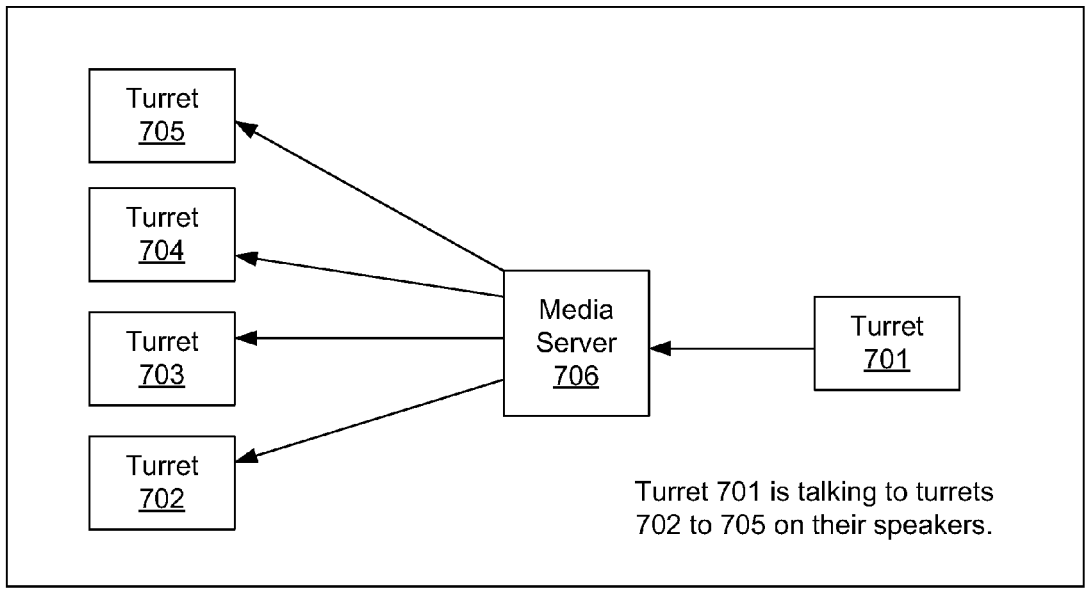
FIGS. 7A and 7B are diagrams for explaining muting, according to one example embodiment.
Figure 7B:
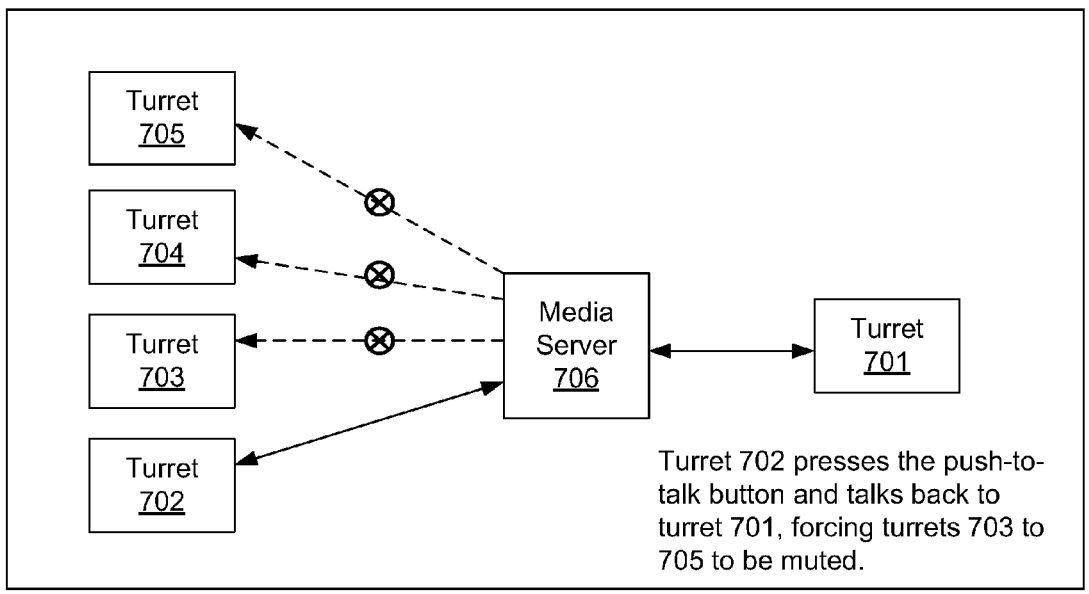

FIGS. 7A and 7B are diagrams for explaining muting. The TPC-enabled application server is not shown in FIGS. 7A and 7B for the purpose of simplifying the explanation of the muting process. Turrets 701 to 705 are similar to turrets 101 to 104 of FIG. 1. Media server 706 is similar to media servers 105 and 106 of FIG. 1. As shown in FIG. 7A, TPC-enabled turrets 701 to 705 are each communicatively coupled to TPC-enabled media server 706 via respective talk paths. The talk path connecting turret 701, to media server 706 has a "Default Call" connection type. The talk paths connecting each of turrets 704 and 705 to media server 706 have a "Speaker Call" connection type. The talk paths connecting turrets 702 and 703 to media server 706 have a "Speaker Call With Global Muting" connection type. The talk paths connecting each of turrets 702 to 705 to media server 706 have an "OFF" push-to-talk state.

As shown in FIG. 7A, media server 706 receives a valid input audio data stream from turret device 701, and turret devices 702 to 705 receive a non-muted output audio data stream from media server 706, via respective talk paths.

Only the talk paths connecting turrets 702 and 703 to media server 706 have a "Speaker Call With Global Muting" connection type (and all the other talk paths have a "Speaker Call" or "Default Call" connection type), and since the push-to-talk state of the talk path connecting turret 702 to media server 706 is "OFF", then according to Table 3, the Connection Muting Level of all talk paths is Level0. Accordingly, the MML, which is the maximum of all CML's, is also Level0. Therefore, according to Table 4, Turrets 702 to 705 have their inputs muted and Turret 701 input is un-muted. According to Table 5, Turrets 701 to 705 have their outputs un-muted.

FIG. 7B illustrates a case in which the push-to-talk (PTT) button of turret 702 is pressed, thereby changing the push-to-talk state turret 702's talk path to "ON", which indicates that turret 702 is sending a valid input audio data stream to media server 706 and the audio data stream from Turret 702 in un-muted. In other words, FIG. 7B depicts a case in which turret 702 "talks" back to turret 701. Since the talk path connecting turret 702 to media server 706 has a "Speaker Call With Global Muting" connection type, and the PTS of this talk path is "ON", the output audio data streams for the talk paths connecting turret devices 703 to 705 to media server 706 are muted.

More specifically, the talk path connecting turret 702 to media server 706 has a "Speaker Call With Global Muting" connection type (and all the other talk paths have a "Speaker Call", "Speaker Call with Global Muting" or "Default Call" connection type), and the push-to-talk state of the talk path connecting turret 702 to media server 706 is "ON". Therefore, according to Table 3, the Connection Muting Level of the talk path connecting turret 702 to media server 706 is Level1. All other talk paths have a Connection Muting Level of Level0. Accordingly, the Mixer Muting Level (MML), which is the maximum of all CML's, is Level1. Therefore, according to Table 4, Turrets 703 to 705 have their inputs muted, and the inputs of Turrets 701 and 702 are un-muted. According to Table 5, the output audio data streams corresponding to the talk paths connecting each of turrets 703 to 705 to media server 706 are muted, and the outputs of Turrets 701 and 702 are un-muted. In a case where the push-to-talk state of a talk path having a "Speaker Call" or "Speaker Call with Global Muting" connection type is changed to "ON", the respective output audio data stream would no longer be muted.

Figure 8:
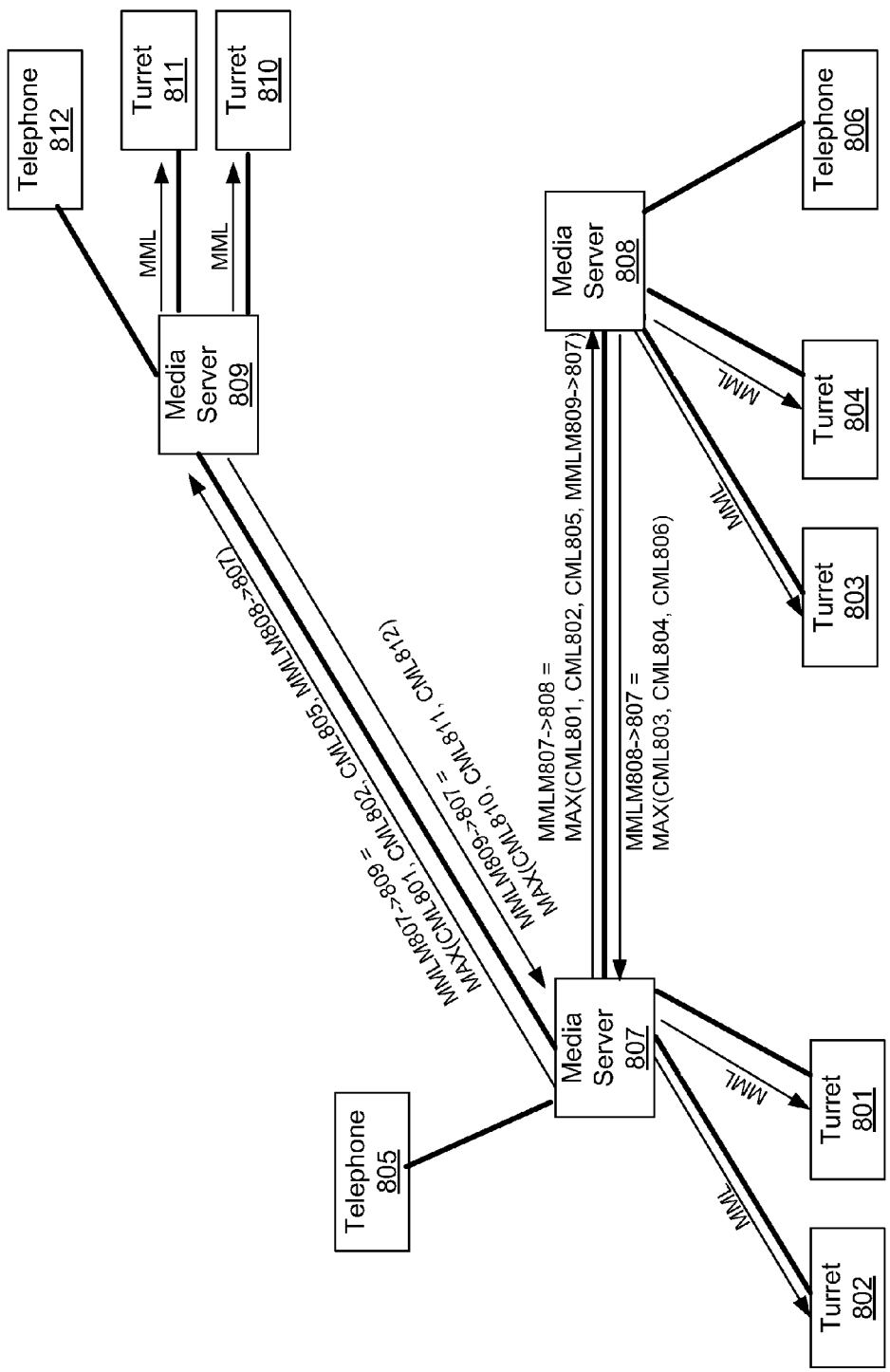
FIG. 8 is a diagram for explaining calculation of muting levels for talk paths between mixers, according to one example embodiment.

FIG. 8 is a diagram for explaining calculation of muting levels for talk paths between mixers. In the example embodiment depicted in FIG. 8, each media server (i.e., 807, 808, and 809) includes a single mixer. In other embodiments, one or more mixers can be in the same media server. Turrets 801 to 804, 810 and 811 are similar to turrets 101 to 104 of FIG. 1. Telephones 805, 806 and 812 are similar to telephones 809 and 810 of FIG. 1.

As described above, the size of a mixer has a capacity, and multiple mixers can be joined together to increase the number of telephony devices that can be included in a conference. Talk paths connecting two mixers have a "Mixer-to-Mixer Connection" connection type. A mixer forwards input audio data streams received by the mixer (from a telephony device connected to the mixer via a talk path) to another mixer via a talk path, along with a Mixer Muting Level Minus (MMLM). As shown in FIG. 8, MMLMx→y is the MMLM value sent from media server x to media server y. The MMLM sent by a mixer is the maximum CML of all talk paths connecting the mixer to a telephony device (e.g., turrets 801 to 804, 810 and 811 and telephones 805, 806 and 812). For example, as shown in FIG. 8, the MMLM sent from media server 808 to media server 807 is Maximum(CML803, CML804, CML806).

For mixers with multiple talk paths to another mixer, the MMLM can be different for each "Mixer-to-Mixer Connection" connection type, as shown in FIG. 8. For example, for media server 807, MMLM807→809 is Maximum(CML801, CML802, CML805, MMLM808→807) and MMLM807→889 is Maximum(CML801, CML802, CML805, MMLM809→807).

In response to receiving an input audio data stream and an MMLM from another mixer via a "Mixer-to-Mixer Connection" talk path, a mixer generates output audio data streams for sending to telephony devices connected to the mixer using the received input audio data stream. In addition, the mixer receiving the MMLM uses the MMLM to calculate the MML. The MML is the maximum of the received MMLM, and all CML's for talk paths between the media server and a telephony device. For example, as shown in FIG. 8, the MML of media server 808 is Maximum(CML803, CML804, CML806, MMLM807→808). Similarly, for media server 807, MML=Maximum(CML801, CML802, CML805, MMLM809→807, MMLM808→807).

The MML in all connected mixers is identical in all mixers and equals the maximum of all the CMLs in the conference call. As shown in FIG. 8, the MML in each of media servers 807, 808 and 809 is the maximum of CML801, CML802, CML803, CML804, CML805, CML806, CML807, CML808, CML809, CML811, and CML812.

Figure 9:
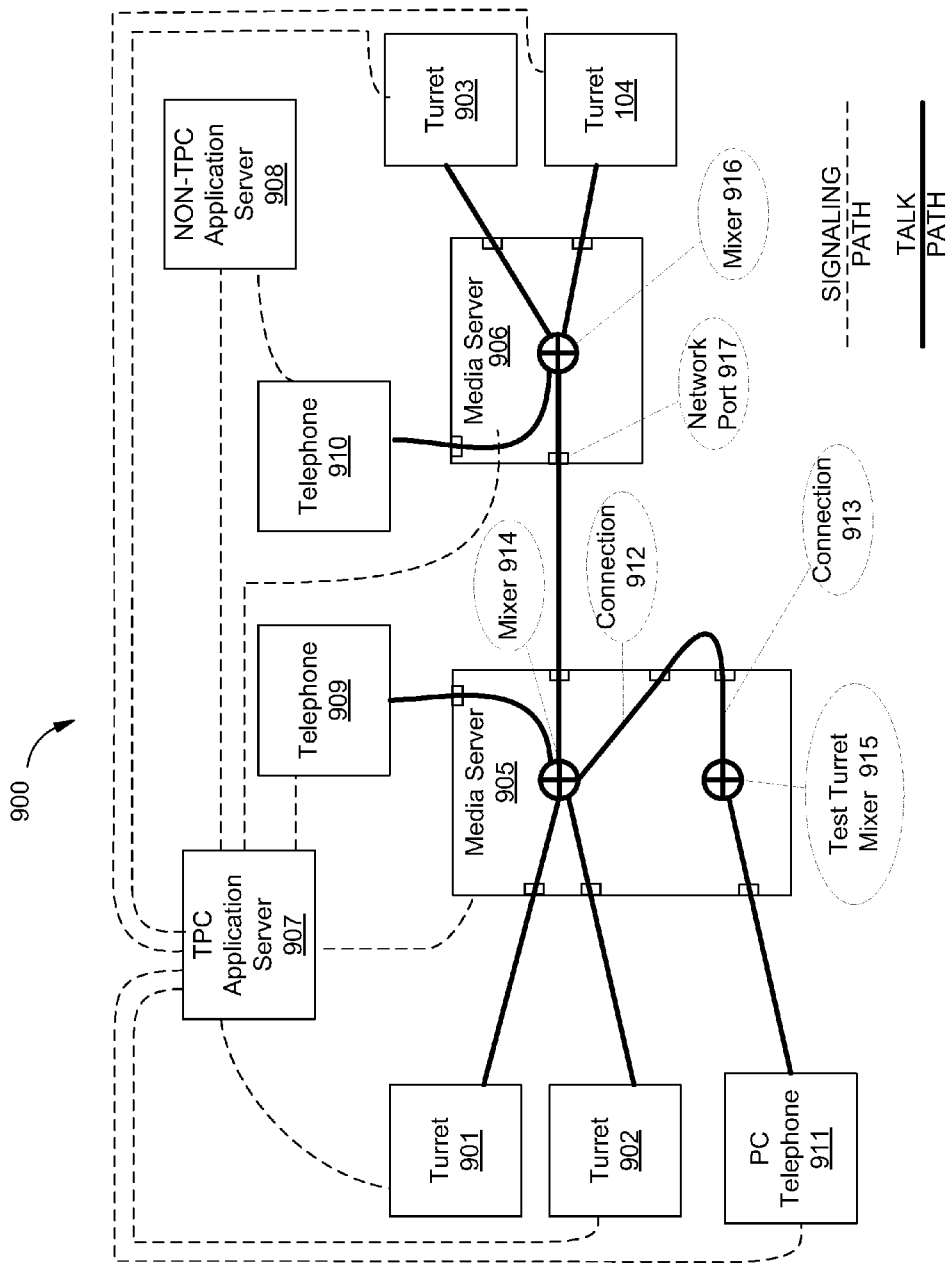
FIG. 9 is a representative diagram of a turret switching system relevant to one example embodiment.

FIG. 9 is a representative diagram of a turret switching system in which a TPC-enabled mixer is configured to behave like a turret for testing purposes (i.e., a test turret). Turrets 901 to 904 are similar to turrets 101 to 104 of FIG. 1. Telephones 909 and 910 are similar to telephones 109 and 110 of FIG. 1. TPC-enabled application server 907 is similar to TPC-enabled application server 107 of FIG. 1. Non-TPC-enabled application server 908 is similar to Non-TPC-enabled application server 108 of FIG. 1. TPC-enabled media servers 905 and 906 are similar to TPC-enabled media servers 105 and 106 of FIG. 1. Mixers 914 and 916 are similar to mixers 111 and 112 of FIG. 5. Network port 917 is similar to network port 113 of FIG. 5.

As shown in FIG. 9, media server 905 includes two mixers, namely mixer 914, and test turret mixer 915 (which is a mixer configured to behave like a test turret). PC telephone 911 is connected to test turret mixer 915 via a talk path having a connection type "default Call". Talk path (i.e., connection) 912 has a connection type that is "Speaker Call", specifically not "Turret Test". Talk path (i.e., connection) 913 has a connection type that is "Turret Test".

Test turret mixer 915 sends the current push-to-talk state (PTS) of the test turret mixer 915 to mixer 905 via talk paths 913 and 912. Mixer 914 saves the received PTS of the test turret mixer 915.

The CML for talk path 912 is determined in a manner similar to that described above with respect to a talk path between a TPC-enabled turret and a mixer.

Mixer 914 sends the test turret mixer 915 a current mixer muting level (MML) of mixer 914 and the last push-to-talk state (PTS) received from the test turret mixer 915 to the test turret mixer 915 via the "TurretTest" talk path (i.e., connection 912). The test turret talk path (i.e., connection 913) ignores and discards the PTS received from the mixer 914's talk path 912. The test turret talk path 913 saves a PTS received from the TPC application server 907, and sends the saved PTS in the next media packet sent to the PC telephone 911.

If a configuration property specifies that the current Mixer Muting Level (MML) received from the test turret mixer 915 is to be sent to a TPC-enabled application server (e.g., 107), then the mixer 914 sends the current Mixer Muting Level (MML) to the TPC-enabled application server via a signaling path between the TPC-enabled application server and the TPC-enabled media server 905.

This disclosure has provided a detailed description with respect to particular representative embodiments. It is understood that the scope of the appended claims is not limited to the above-described embodiments and that various changes and modifications may be made without departing from the scope of the claims.

What is claimed:

1. A turret switching system for broadcasting data streams to a plurality of telephony devices via a plurality of talk paths, the system comprising:
    at least one media server; and
    a plurality of telephony devices communicatively coupled to the at least one media server via a plurality of respective talk paths, each talk path having a corresponding predetermined connection type,
    wherein each telephony device is constructed to receive an output audio data stream from the at least one media server via the respective talk path, and each telephony device is constructed to send an input audio data stream to the at least one media server via the respective talk path,
    wherein the at least one media server comprises at least one mixer that combines input audio data streams received from the plurality of telephony devices to generate output audio data streams for sending to the plurality of telephony devices in association with a call,
    wherein for each talk path associated with the call, a determination is made as to whether to mute the respective output audio data stream, based on the respective predetermined connection type, and
    wherein responsive to a determination that the respective output audio data stream for a talk path is to be muted, the respective output audio data stream is muted.

2. The turret switching system of claim 1, wherein responsive to a change of a connection state of at least one of the plurality of talk paths, a determination is made for each talk path as to whether to mute the respective output audio data stream, based on the at least one changed connection state.

3. The turret switching system of claim 1, wherein for each talk path associated with the call, the determination is further based on a state of the respective input audio data stream that is sent to the at least one media server via the talk path.

4. The turret switching system of claim 3, wherein in a case where at least one talk path has a speaker-call-with-global-muting connection type, and the respective input audio data stream has an ON state, it is determined that output audio data streams corresponding to talk paths whose respective input audio data streams have an OFF state are to be muted.

5. The turret switching system of claim 3,
    wherein in a case where at least one talk path has a privacy connection type, and the respective input audio data stream has an ON state, it is determined that output audio data streams and input audio data streams corresponding to talk paths having a connection type other than the privacy connection type are to be muted, and
    wherein in the case where the at least one talk path has the privacy connection type, and the connection type of another talk path subsequently changes to the privacy connection type, it is determined that the output audio data stream and the input audio data stream of the other talk path are to remain muted.

6. The turret switching system of claim 3, wherein in a case where at least one talk path has a handset-call-with-no-speakers connection type, it is determined that output audio data streams and input audio data streams corresponding to talk paths having a speaker call connection type are to be muted.

7. The turret switching system of claim 1, wherein the turret switching system is a trading turret switching system.

8. The turret switching system of claim 1, further comprising an application server that creates the plurality of talk paths using Session Initiation Protocol ("SIP"), and sets the connection type for each talk path.

9. A turret switching method for broadcasting data streams to a plurality of telephony devices via a plurality of talk paths, the method comprising:
    determining, for each telephony device associated with a call in a turret switching system comprising at least one media server and a plurality of telephony devices, whether to mute a respective output audio data stream, based on a respective predetermined connection type of the respective talk path that communicatively couples the respective telephony device to the at least one media server;
    responsive to a determination that the respective output audio data stream for a telephony device is to be muted, muting the respective output audio data stream, such that at least one speaker of the telephony device does not output an audible signal corresponding to the output audio data stream,
    wherein each telephony device is communicatively coupled to the at least one media server via the respective talk path, each talk path has a corresponding predetermined connection type, each telephony device is constructed to receive the respective output audio data stream from the at least one media server via the respective talk path, and each telephony device is constructed to send an input audio data stream to the at least one media server via the respective talk path, and
    wherein the at least one media server comprises at least one mixer that combines input audio data streams received from the plurality of telephony devices to generate output audio data streams for sending to the plurality of telephony devices in association with the call.

10. The turret switching method of claim 9, wherein responsive to a change of a connection state of at least one of the plurality of talk paths, a determination is made for each talk path as to whether to mute the respective output audio data stream, based on the at least one changed connection state.

11. The turret switching method of claim 9, wherein for each talk path associated with the call, the determining is further based on a state of the respective input audio data stream that is sent to the at least one media server via the talk path.

12. The turret switching method of claim 11, wherein in a case where at least one talk path has a speaker-call-with-global-muting connection type, and the respective input audio data stream has an ON state, it is determined that output audio data streams corresponding to talk paths whose respective input audio data streams have an OFF state are to be muted.

13. The turret switching method of claim 11,
wherein in a case where at least one talk path has a privacy connection type, and the respective input audio data stream has an ON state, it is determined that output audio data streams and input audio data streams corresponding to talk paths having a connection type other than the privacy connection type are to be muted, and
wherein in the case where the at least one talk path has the privacy connection type, and the connection type of another talk path subsequently changes to the privacy connection type, it is determined that the output audio data stream and the input audio data stream of the other talk path are to remain muted.

14. The turret switching method of claim 11, wherein in a case where at least one talk path has a handset-call-with-no-speakers connection type, it is determined that output audio data streams and input audio data streams corresponding to talk paths having a speaker call connection type are to be muted.

15. The turret switching method of claim 9, wherein the turret switching system is a trading turret switching system.

16. The turret switching method of claim 9, further comprising an application server that creates the plurality of talk paths using Session Initiation Protocol ("SIP"), and sets the connection type for each talk path.

17. A turret device comprising:
a computer-readable memory constructed to store computer-executable process steps; and
a processor constructed to execute the computer-executable process steps stored in the memory;
wherein the turret device is communicatively coupled to at least one media server via a talk path,
wherein the process steps stored in the memory cause the processor to broadcast data streams to a plurality of telephony devices via a plurality of other talk paths, each talk path having a corresponding predetermined connection type, wherein the process steps include computer-executable process steps to:
receive a respective output audio data stream from the at least one media server via the respective talk path; and
send an input audio data stream to the at least one media server via the respective talk path,
wherein, for each talk path associated with a call, the at least one media server determines whether to mute the respective output audio data stream for the respective telephony device, based on the respective predetermined connection type of the respective talk path that communicatively couples the respective telephony device to the at least one media server,
wherein, responsive to a determination that the respective output audio data stream for the telephony device is to be muted, the at least one media server mutes the respective output audio data stream, such that at least one speaker of the telephony device does not output an audible signal corresponding to the output audio data stream, and
wherein the at least one media server comprises at least one mixer that combines input audio data streams received from the plurality of telephony devices to generate output audio data streams for sending to the plurality of telephony devices in association with the call.

18. The turret device of claim 17, wherein responsive to a change of a connection state of at least one of the plurality of talk paths, a determination is made for each telephony device as to whether to mute the respective output audio data stream, based on the at least one changed connection state.

19. The turret device of claim 17, wherein for each talk path associated with the call, the determination is further based on a state of the respective input audio data stream that is sent to the at least one media server via the talk path.

20. The turret device of claim 19, wherein in a case where at least one talk path has a speaker-call-with-global-muting connection type, and the respective input audio data stream has an ON state, it is determined that output audio data streams corresponding to talk paths whose respective input audio data streams have an OFF state are to be muted.

21. The turret device of claim 19,
wherein in a case where at least one talk path has a privacy connection type, and the respective input audio data stream has an ON state, it is determined that output audio data streams and input audio data streams corresponding to talk paths having a connection type other than the privacy connection type are to be muted, and
wherein in the case where the at least one talk path has the privacy connection type, and the connection type of another talk path subsequently changes to the privacy connection type, it is determined that the output audio data stream and the input audio data stream of the other talk path are to remain muted.

22. The turret device of claim 19, wherein in a case where at least one talk path has a handset-call-with-no-speakers connection type, it is determined that output audio data streams and input audio data streams corresponding to talk paths having a speaker call connection type are to be muted.

23. The turret device of claim 17, wherein the turret switching system is a trading turret switching system.

24. The turret device of claim 17, further comprising an application server that creates the plurality of talk paths using Session Initiation Protocol ("SIP"), and sets the connection type for each talk path.

25. A computer-readable memory medium on which is stored computer-executable process steps for causing a telephony device, which is communicatively coupled to at least one media server via a respective talk path, to broadcast data streams to a plurality of other telephony devices via a plurality of other respective talk paths, each talk path having a corresponding predetermined connection type, wherein the process steps comprise:
receiving a respective output audio data stream from the at least one media server via the respective talk path; and
sending an input audio data stream to the at least one media server via the respective talk path,
wherein, for each talk path associated with a call, the at least one media server determines whether to mute the respective output audio data stream for the telephony device, based on the respective predetermined connection type of the talk path that communicatively couples the respective telephony device to the at least one media server,
wherein, responsive to a determination that the respective output audio data stream for the telephony device is to be muted, the at least one media server mutes the respective output audio data stream, such that at least one speaker of the telephony device does not output an audible signal corresponding to the output audio data stream, and wherein the at least one media server comprises at least one mixer that combines input audio data streams received from the plurality of telephony devices to generate output audio data streams for sending to the plurality of telephony devices in association with the call.

26. The computer-readable memory medium of claim 25, wherein responsive to a change of a connection state of at least one of the plurality of talk paths, a determination is made for each telephony device as to whether to mute the respective output audio data stream, based on the at least one changed connection state.

27. The computer-readable memory medium of claim 25, wherein for each talk path associated with the call, the determination is further based on a state of the respective input audio data stream that is sent to the at least one media server via the talk path.

28. The computer-readable memory medium of claim 27, wherein in a case where at least one talk path has a speaker-call-with-global-muting connection type, and the respective input audio data stream has an ON state, it is determined that output audio data streams corresponding to talk paths whose respective input audio data streams have an OFF state are to be muted.

29. The computer-readable memory medium of claim 27,
wherein in a case where at least one talk path has a privacy connection type, and the respective input audio data stream has an ON state, it is determined that output audio data streams and input audio data streams corresponding to talk paths having a connection type other than the privacy connection type are to be muted, and
wherein in the case where the at least one talk path has the privacy connection type, and the connection type of another talk path subsequently changes to the privacy connection type, it is determined that the output audio data stream and the input audio data stream of the other talk path are to remain muted.

30. The computer-readable memory medium of claim 27, wherein in a case where at least one talk path has a handset-call-with-no-speakers connection type, it is determined that output audio data streams and input audio data streams corresponding to talk paths having a speaker call connection type are to be muted.

31. The computer-readable memory medium of claim 25, wherein the turret switching system is a trading turret switching system.

32. The computer-readable memory medium of claim 25, further comprising an application server that creates the plurality of talk paths using Session Initiation Protocol ("SIP"), and sets the connection type for each talk path.

33. A media server comprising:
a computer-readable memory constructed to store computer-executable process steps;
a processor constructed to execute the computer-executable process steps stored in the memory;
at least one mixer;
wherein the process steps stored in the memory cause the processor to broadcast data streams to a plurality of telephony devices via a plurality of talk paths, respectively, each talk path having a corresponding predetermined connection type, wherein the process steps include computer-executable process steps to:
determine, for each of the plurality of telephony devices associated with a call, whether to mute a respective output audio data stream, based on the respective predetermined connection type of the respective talk path that communicatively couples the respective telephony device to the media server;
responsive to a determination that the respective output audio data stream for a telephony device is to be muted, mute the respective output audio data stream, such that at least one speaker of the telephony device does not output an audible signal corresponding to the output audio data stream,
wherein each telephony device is communicatively coupled to the media server via the respective talk path, each telephony device is constructed to receive the respective output audio data stream from the media server via the respective talk path, and each telephony device is constructed to send an input audio data stream to the media server via the respective talk path, and
wherein the at least one mixer combines input audio data streams received from the plurality of telephony devices to generate output audio data streams for sending to the plurality of telephony devices in association with the call.

34. The media server of claim 33, wherein responsive to a change of a connection state of at least one of the plurality of talk paths, a determination is made for each telephony device as to whether to mute the respective output audio data stream, based on the at least one changed connection state.

35. The media server of claim 33, wherein for each talk path associated with the call, the determination is further based on a state of the respective input audio data stream that is sent to the at least one media server via the talk path.

36. The media server of claim 35, wherein in a case where at least one talk path has a speaker-call-with-global-muting connection type, and the respective input audio data stream has an ON state, it is determined that output audio data streams corresponding to talk paths whose respective input audio data streams have an OFF state are to be muted.

37. The media server of claim 35,
wherein in a case where at least one talk path has a privacy connection type, and the respective input audio data stream has an ON state, it is determined that output audio data streams and input audio data streams corresponding to talk paths having a connection type other than the privacy connection type are to be muted, and
wherein in the case where the at least one talk path has the privacy connection type, and the connection type of another talk path subsequently changes to the privacy connection type, it is determined that the output audio data stream and the input audio data stream of the other talk path are to remain muted.

38. The media server of claim 35, wherein in a case where at least one talk path has a handset-call-with-no-speakers connection type, it is determined that output audio data streams and input audio data streams corresponding to talk paths having a speaker call connection type are to be muted.

39. The media server of claim 33, further comprising an application server that creates the plurality of talk paths using Session Initiation Protocol ("SIP"), and sets the connection type for each talk path.

40. A computer-readable memory medium on which is stored computer-executable process steps for causing a media server to broadcast data streams to a plurality of telephony devices via a plurality of talk paths, respectively, each talk path having a corresponding predetermined connection type, wherein the process steps comprise:
determining, for each of the plurality of telephony devices associated with a call, whether to mute a respective output audio data stream, based on the respective predetermined connection type of the respective talk path that communicatively couples the respective telephony device to the media server;

responsive to a determination that the respective output audio data stream for a telephony device is to be muted, muting the respective output audio data stream, such that at least one speaker of the telephony device does not output an audible signal corresponding to the output audio data stream, wherein each telephony device is communicatively coupled to the media server via the respective talk path, each telephony device is constructed to receive the respective output audio data stream from the media server via the respective talk path, and each telephony device is constructed to send an input audio data stream to the media server via the respective talk path, and wherein the media server comprises at least one mixer that combines input audio data streams received from the plurality of telephony devices to generate output audio data streams for sending to the plurality of telephony devices in association with the call.

41. The computer-readable memory medium of claim 40, wherein responsive to a change of a connection state of at least one of the plurality of talk paths, a determination is made for each telephony device as to whether to mute the respective output audio data stream, based on the at least one changed connection state.

42. The computer-readable memory medium of claim 40, wherein for each talk path associated with the call, the determination is further based on a state of the respective input audio data stream that is sent to the at least one media server via the talk path.

43. The computer-readable memory medium of claim 42, wherein in a case where at least one talk path has a speaker-call-with-global-muting connection type, and the respective input audio data stream has an ON state, it is determined that output audio data streams corresponding to talk paths whose respective input audio data streams have an OFF state are to be muted.

44. The computer-readable memory medium of claim 42,
wherein in a case where at least one talk path has a privacy connection type, and the respective input audio data stream has an ON state, it is determined that output audio data streams and input audio data streams corresponding to talk paths having a connection type other than the privacy connection type are to be muted, and wherein in the case where the at least one talk path has the privacy connection type, and the connection type of another talk path subsequently changes to the privacy connection type, it is determined that the output audio data stream and the input audio data stream of the other talk path are to remain muted.

45. The computer-readable memory medium of claim 42, wherein in a case where at least one talk path has a handset-call-with-no-speakers connection type, it is determined that output audio data streams and input audio data streams corresponding to talk paths having a speaker call connection type are to be muted.

46. The computer-readable memory medium of claim 40, further comprising an application server that creates the plurality of talk paths using Session Initiation Protocol ("SIP"), and sets the connection type for each talk path.

47. The turret switching system of claim 1, wherein the telephony devices include at least one of a turret device, a telephone, and a VoIP(Voice over IP) device.

48. The turret switching system of claim 1, wherein the at least one mixer mutes the output audio data streams.

49. The turret switching system of claim 1, wherein each telephony device is constructed to receive an output audio data stream from the at least one media server via the respective talk path using RTP (real-time transfer protocol), and each telephony device is constructed to send an input audio data stream to the at least one media server via the respective talk path using RTP.

50. The turret switching system of claim 1, wherein the mixer is communicatively coupled to another mixer, wherein the mixer forwards input audio data streams received by the mixer to the other mixer via a talk path, along with a mixer muting level, and wherein for each talk path connecting the mixer to a telephony device, the mixer determines whether to mute the respective output audio data stream based on a mixer muting level received from the other mixer and based on connection states of each of the plurality of talk paths connected to a telephony device.

51. The turret switching method of claim 9, wherein the telephony devices include at least one of a turret device, a telephone, and a VoIP(Voice over IP) device.

52. The turret switching method of claim 9, wherein the at least one mixer mutes the output audio data streams.

53. The turret switching method of claim 9, wherein each telephony device is constructed to receive an output audio data stream from the at least one media server via the respective talk path using RTP (real-time transfer protocol), and each telephony device is constructed to send an input audio data stream to the at least one media server via the respective talk path using RTP.

54. The turret switching method of claim 9, wherein the mixer is communicatively coupled to another mixer, wherein the mixer forwards input audio data streams received by the mixer to the other mixer via a talk path, along with a mixer muting level, and wherein for each talk path connecting the mixer to a telephony device, the mixer determines whether to mute the respective output audio data stream based on a mixer muting level received from the other mixer and based on connection states of each of the plurality of talk paths connected to a telephony device.

55. The turret device of claim 17, wherein the telephony devices include at least one of a second turret device, a telephone, and a VoIP (Voice over IP) device.

56. The turret device of claim 17, wherein the at least one mixer mutes the output audio data streams.

57. The turret device of claim 17, wherein each telephony device is constructed to receive an output audio data stream from the at least one media server via the respective talk path using RTP (real-time transfer protocol), and each telephony device is constructed to send an input audio data stream to the at least one media server via the respective talk path using RTP.

58. The turret device of claim 17, wherein the mixer is communicatively coupled to another mixer, wherein the mixer forwards input audio data streams received by the mixer to the other mixer via a talk path, along with a mixer muting level, and wherein for each talk path connecting the mixer to a telephony device, the mixer determines whether to mute the respective output audio data stream based on a mixer muting level received from the other mixer and based on connection states of each of the plurality of talk paths connected to a telephony device.

59. The computer-readable memory medium of claim 25, wherein the telephony devices include at least one of a turret device, a telephone, and a VoIP(Voice over IP) device.

60. The computer-readable memory medium of claim 25, wherein the at least one mixer mutes the output audio data streams.

61. The computer-readable memory medium of claim 25, wherein each telephony device is constructed to receive an output audio data stream from the at least one media server via the respective talk path using RTP (real-time transfer protocol), and each telephony device is constructed to send an input audio data stream to the at least one media server via the respective talk path using RTP.

62. The computer-readable memory medium of claim 25, wherein the mixer is communicatively coupled to another mixer, wherein the mixer forwards input audio data streams received by the mixer to the other mixer via a talk path, along with a mixer muting level, and wherein for each talk path connecting the mixer to a telephony device, the mixer determines whether to mute the respective output audio data stream based on a mixer muting level received from the other mixer and based on connection states of each of the plurality of talk paths connected to a telephony device.

63. The media server of claim 33, wherein the telephony devices include at least one of a turret device, a telephone, and a VoIP(Voice over IP) device.

64. The media server of claim 33, wherein the at least one mixer mutes the output audio data streams.

65. The media server of claim 33, wherein each telephony device is constructed to receive an output audio data stream from the at least one media server via the respective talk path using RTP (real-time transfer protocol), and each telephony device is constructed to send an input audio data stream to the at least one media server via the respective talk path using RTP.

66. The media server of claim 33, wherein the mixer is communicatively coupled to another mixer, wherein the mixer forwards input audio data streams received by the mixer to the other mixer via a talk path, along with a mixer muting level, and wherein for each talk path connecting the mixer to a telephony device, the mixer determines whether to mute the respective output audio data stream based on a mixer muting level received from the other mixer and based on connection states of each of the plurality of talk paths connected to a telephony device.

67. The computer-readable memory medium of claim 40, wherein the telephony devices include at least one of a turret device, a telephone, and a VoIP(Voice over IP) device.

68. The computer-readable memory medium of claim 40, wherein the at least one mixer mutes the output audio data streams.

69. The computer-readable memory medium of claim 40, wherein each telephony device is constructed to receive an output audio data stream from the at least one media server via the respective talk path using RTP (real-time transfer protocol), and each telephony device is constructed to send an input audio data stream to the at least one media server via the respective talk path using RTP.

70. The computer-readable memory medium of claim 40, wherein the mixer is communicatively coupled to another mixer, wherein the mixer forwards input audio data streams received by the mixer to the other mixer via a talk path, along with a mixer muting level, and wherein for each talk path connecting the mixer to a telephony device, the mixer determines whether to mute the respective output audio data stream based on a mixer muting level received from the other mixer and based on connection states of each of the plurality of talk paths connected to a telephony device.

* * * * *

UNITED STATES PATENT AND TRADEMARK OFFICE
CERTIFICATE OF CORRECTION

PATENT NO. : 8,767,942 B2
APPLICATION NO. : 12/576774
DATED : July 1, 2014
INVENTOR(S) : Daniel Raymond Elliott Page 1 of 2

It is certified that error appears in the above-identified patent and that said Letters Patent is hereby corrected as shown below:

In the Specification

COLUMN 5

Line 67, insert a --.-- after "device".

COLUMN 7

Line 13, "such a" should read --such as--.

COLUMN 10

Line 63, "CML's" should read --CMLs--.
Line 65, "CML's" should read --CMLs--.

COLUMN 12

Line 53, "CML's" should read --CMLs--.
Table 3, third column, "INPUT Connection Type" should be moved up 1 line.

COLUMN 13

Table 4, fourth column, "INPUT Connection Type" should be moved up one line.
Table 5, first column, "OUTPUT Return Value Mute/Normal" should be moved up one line.
Table 5, fourth column, "INPUT Connection Type" should be moved up one line.

Signed and Sealed this
Thirtieth Day of December, 2014

Michelle K. Lee
*Deputy Director of the United States Patent and Trademark Office*

CERTIFICATE OF CORRECTION (continued)
U.S. Pat. No. 8,767,942 B2

COLUMN 14

Table 5 (continued), first column, "OUTPUT Return Value Mute/Normal" should be moved up one line.
Table 5 (continued), fourth column, "INPUT Connection Type" should be moved up one line.

COLUMN 15

Line 28, "CML's" should read --CMLs--.
Line 54, "CML's" should read --CMLs--.

COLUMN 16

Line 35, "CML's" should read --CMLs--.